Jan. 17, 1950  H. P. PRIGG  2,494,581
CHILD'S COMBINATION CAR SEAT AND SWING
Filed Sept. 19, 1947

INVENTOR.
Herbert Paul Prigg
BY Victor J. Evans & Co.
ATTORNEYS

Patented Jan. 17, 1950

2,494,581

UNITED STATES PATENT OFFICE 2,494,581

CHILD'S COMBINATION CAR SEAT AND SWING

Herbert Paul Prigg, Miami, Fla.

Application September 19, 1947, Serial No. 775,113

4 Claims. (Cl. 155—79)

This invention relates to portable child's seats of the type adapted to be suspended over the back of an automobile seat, and in particular a seat having hook-like brackets which in one position, are adapted to support the seat from the back of a motor vehicle seat, and in another support the seat from the back of a chair to provide a high chair, and which may be hooked into arms of the seat to provide attaching means for ropes or springs to provide a swing.

The purpose of this invention is to provide adjustable supporting means for child's seats so that the seat is adapted for universal use such as in a motor vehicle, or home and which may also be used as a swing.

Various types of small seats have been provided for children riding in motor vehicles and these have been supported by hooks, brackets, and other devices, but in these the supporting means is only adapted to suspend the seat from the back of a seat of a certain type, and particularly when traveling, it is desirable to use the seat for different purposes.

The object of this invention is to provide supporting brackets for suspending seats from backs of larger seats that are readily adjustable to fit seats or chairs of different designs.

Another object is to provide supporting means for child's seats in motor vehicles wherein the seat may also be used as a swing.

A further object of the invention is to provide a child's car seat having universal supporting means which is of a simple and economical construction.

With these and other objects and advantages in view the invention consists of the novel details of construction, arrangement and combination of parts more fully hereinafter described, claimed and illustrated in the accompanying drawings, wherein:

Figure 2:
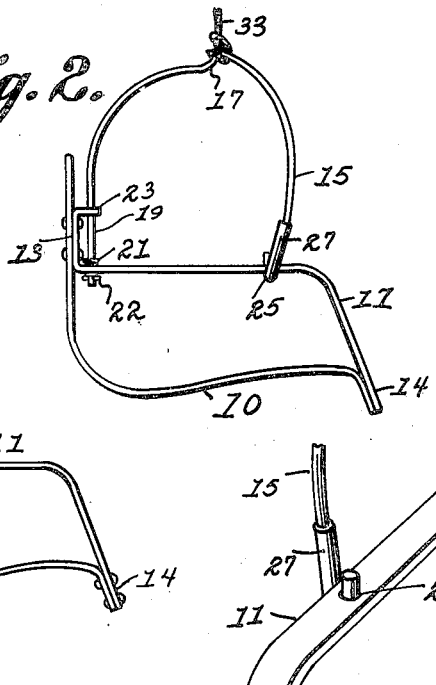
Figure 2 is a view showing an end elevation of a seat with the supporting brackets in position in a swing.
Figure 1:
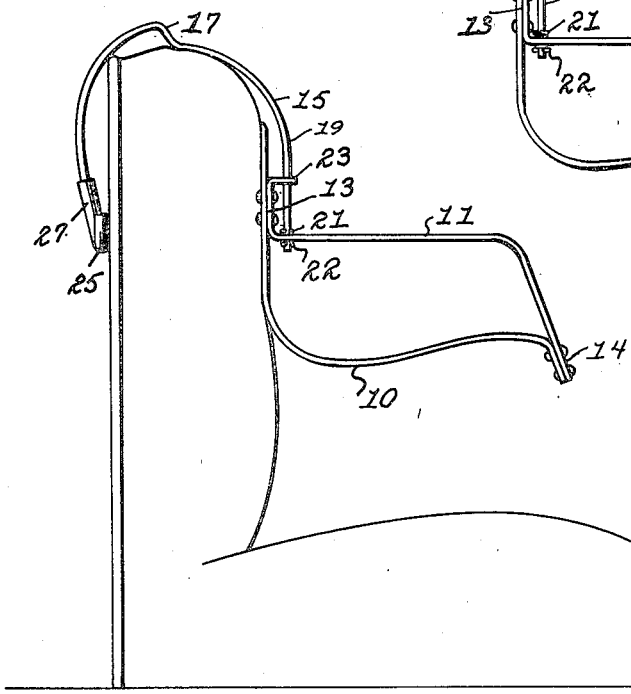
Figure 1 is a view showing an end elevation of a motor vehicle seat with the improved child's seat supported thereon.
Figure 3:
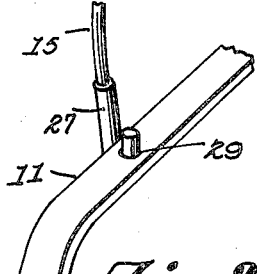
Figure 3 is a detail showing a connection of an outer end of one of the supporting brackets with an arm of the seat, with parts broken away.
Figure 5:
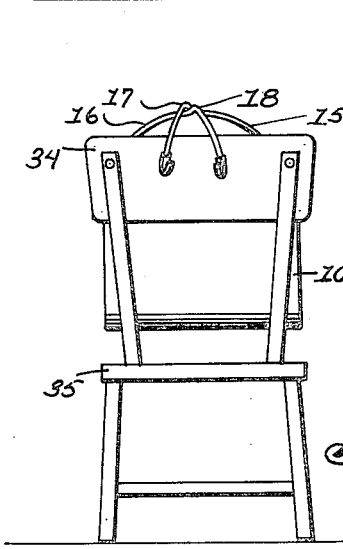
Figure 5 is a view showing a rear elevation of a chair with the seat supported thereon to provide a high chair.

Referring now to the drawings wherein like reference characters indicate corresponding parts the child's seat of this invention includes a seat 10 of plywood or the like with arms 11 and 12 attached to the seat at points 13 and 14 at each side, and hook-like brackets 15 and 16 which have offset sections 17 and 18 intermediate of the ends as shown in Figures 1, 2 and 5.

The inner ends 19 and 20 of the brackets are pivotally mounted in the inner ends of the arms with the extreme ends provided with collars 21 and 22 on each side of the arms which permit turning of the bracket and present lengthwise movement. The extreme ends of the arms extend outward providing flanges 23 and 24 through which the ends of the brackets also extend providing two points of support therefor.

Figure 4:
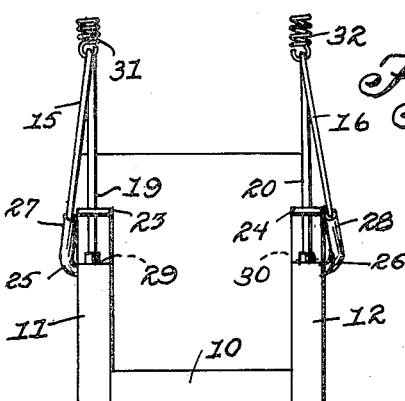
Figure 4 is a view showing a front elevation of the seat with the supporting brackets in position in a swing seat.

The opposite ends of the brackets are provided with hooks 25 and 26 having covering sleeves 27 and 28 of rubber or the like, and when the seat is used as a swing the ends forming the hooks are positioned in openings 29 and 30 in the arms 11 and 12. The brackets may be supported by springs 31 and 32, as shown in Figure 4, or by a rope 33 as shown in Figure 2.

When used to form a high chair the offset sections 17 and 18 are interlocked with the brackets crossed, as shown in Figure 5 wherein the seat may be suspended from the back 34 of a chair 35. In this position the rubber covered hooks bear against the rear surface of the back of the seat.

It will be understood that modifications may be made in the design and arrangement of the parts without departing from the spirit of the invention.

What is claimed is:

1. In a portable seat for motor vehicles and the like, a seat having arms spaced thereabove, hook-like brackets having offset sections intermediate the ends and hooks on the outer ends, and means pivotally mounting the inner ends of the brackets in the inner ends of the arms, said arms having openings therein to receive the outer ends of the brackets.

2. In a portable seat for motor vehicles and the like, a seat having a back and arms spaced thereabove with the arms connected to the back and forward edge of the seat, hook-like brackets having hooks on the outer ends thereof, resilient tubes covering the hooks on the ends of the brackets, and means pivotally mounting the inner ends of the brackets in the inner ends of the arms with the hooks at the outer ends of the brackets adapted to be held in openings in the arms.

3. As an article of manufacture a seat having a back with arms spaced above the seat the ends of which are attached to the back and forward edge of the seat, said arms having openings in the outer ends thereof, and hook-like brackets with offset portions intermediate of the ends and resilient covered hooks at the outer ends thereof pivotally mounted by their inner ends in the inner ends of the arms with the hooks at the outer ends thereof adapted to extend backward or forwards to be positioned in the openings in the arms.

4. In a portable vehicle seat, the combination, which comprises, a seat having a back and arms spaced above the seat, the arms having flanges extending outward from the back above the inner ends of the arms, and hook-like brackets with offset intermediate portions and rubber covered hooks at the outer ends pivotally mounted on the arms with the inner ends thereof extending through the said flanges and arms and with the said rubber covered hooks adapted to be positioned in openings in the said arms of the seat.

HERBERT PAUL PRIGG.

REFERENCES CITED

The following references are of record in the file of this patent:

UNITED STATES PATENTS

| Number | Name | Date |
|---|---|---|
| 834,383 | Johnson | Oct. 30, 1906 |
| 1,157,458 | Thompson | Oct. 19, 1915 |
| 1,246,721 | Crawford | Nov. 13, 1917 |
| 2,399,792 | Copp | May 7, 1946 |